(12) United States Patent
Piazzolla

(10) Patent No.: US 9,050,881 B2
(45) Date of Patent: Jun. 9, 2015

(54) HYBRID PROPULSION SYSTEMS FOR VEHICLES AND TRANSMISSIONS FOR PROPULSION SYSTEMS

(71) Applicant: OERLIKON GRAZIANO S.p.A., Rivoli (Torino) (IT)

(72) Inventor: Renato Piazzolla, Turin (IT)

(73) Assignee: OERLIKON GRAZIANO S.p.A., Rivoli, TO (IT)

( * ) Notice: Subject to any disclaimer, the term of this patent is extended or adjusted under 35 U.S.C. 154(b) by 0 days.

(21) Appl. No.: 14/053,608

(22) Filed: Oct. 15, 2013

(65) Prior Publication Data

US 2014/0106920 A1    Apr. 17, 2014

(30) Foreign Application Priority Data

Oct. 17, 2012   (IT) .............................. TO2012A0915

(51) Int. Cl.

| B60K 6/383 | (2007.10) |
| B60K 6/543 | (2007.10) |
| B60K 6/48  | (2007.10) |
| B60K 6/52  | (2007.10) |
| B60K 6/547 | (2007.10) |

(52) U.S. Cl.
CPC ................. *B60K 6/383* (2013.01); *B60K 6/543* (2013.01); *Y10S 903/902* (2013.01); *B60K 6/48* (2013.01); *B60K 6/52* (2013.01); *B60K 6/547* (2013.01); *B60K 2006/4825* (2013.01); *Y02T 10/6221* (2013.01); *Y02T 10/6252* (2013.01); *Y02T 10/6265* (2013.01)

(58) Field of Classification Search
None
See application file for complete search history.

(56) References Cited

U.S. PATENT DOCUMENTS

| 2010/0243348 A1  | 9/2010 | Nomura et al. |
| 2013/0012347 A1* | 1/2013 | Ortmann et al. ................. 475/5 |

FOREIGN PATENT DOCUMENTS

| EP | 2360044 A1    | 8/2011 |
| FR | 2970209 A1    | 7/2012 |
| WO | 2007138353 A2 | 12/2007 |

* cited by examiner

*Primary Examiner* — Erin D Bishop
(74) *Attorney, Agent, or Firm* — Robert E. Alderson, Jr.

(57) ABSTRACT

Hybrid propulsion systems are provided which include an internal combustion engine, an electric machine, a primary shaft adapted to receive the rotary motion from the electric machine, a secondary shaft, a differential for transmitting the rotary motion to the wheels of an axle of the vehicle, a first transmission mechanism interposed between the primary shaft and the secondary shaft for transmitting the rotary motion between the primary shaft and the secondary shaft, a second transmission mechanism interposed between the secondary shaft and the differential for transmitting the rotary motion between the secondary shaft and the differential, and an overrunning clutch associated to the secondary shaft, whereby the secondary shaft receives the rotary motion from the internal combustion engine via the overrunning clutch.

8 Claims, 3 Drawing Sheets

HYBRID PROPULSION SYSTEMS FOR VEHICLES AND TRANSMISSIONS FOR PROPULSION SYSTEMS

CROSS REFERENCE TO RELATED APPLICATION

This application claims priority to and benefit of Italian Patent Application No. TO2012A000915 filed Oct. 17, 2012, the contents of which are incorporated by reference in their entirety.

FIELD OF THE INVENTION

The present invention relates in general to hybrid propulsion systems for vehicles, having an internal combustion engine and an electric machine adapted to enable the vehicle to run either in a purely electric mode, i.e. with the driving torque being entirely generated by the electric machine, or in hybrid mode, i.e. with the driving torque being generated in part by the electric machine and in part by the internal combustion engine, and to transmissions for such propulsion systems.

BACKGROUND OF THE INVENTION

Conventional transmissions are described in, for example, FR-A-2 970 209. According to such known solutions, an overrunning clutch is interposed between a hub drivingly connected for rotation with a secondary shaft of the transmission and a ring gear drivingly connected for rotation with a drive shaft of the internal combustion engine, whereby in the engaged condition of the overrunning clutch the secondary shaft is drivingly connected for rotation with the drive shaft of the internal combustion engine.

SUMMARY OF THE INVENTION

The present invention provides transmissions for hybrid motor vehicles that are simple and compact and are able to offer a wide range of possible operating modes, and in particular that allow the use of electric machines as the main motor and the internal combustion engine as an auxiliary motor.

The present invention achieves these goals by virtue of transmissions for hybrid motor vehicles as described and claimed herein.

In short, the present invention connects the secondary shaft of the transmission on one side to the primary shaft of the transmission, via a gearing and/or a mechanical gearbox, to receive the rotary motion from the electric machine and on the other side to the internal combustion engine of the vehicle, via an overrunning clutch and a reducer mechanism. In a hybrid motor vehicle provided with a transmission according to the invention, therefore, the electric machine forms the main traction motor of the vehicle, as it is permanently connected to the primary shaft of the transmission which in turn is connected to the vehicle wheels, while the internal combustion engine of the vehicle is connectable to the secondary shaft of the transmission to transmit torque to the vehicle wheels via the over-running clutch. Moreover, by virtue of a reducer mechanism arranged upstream of the overrunning clutch, and hence interposed between the internal combustion engine of the vehicle and the overrunning clutch, the transmission according to the invention has, inter alia, a more compact layout than the prior art.

BRIEF DESCRIPTION OF THE FIGURES

Further features and advantages of the present invention will become apparent from the following detailed description, given purely by way of non-limiting example with reference to the appended drawings briefly described below.

DETAILED DESCRIPTION

Figure 1:
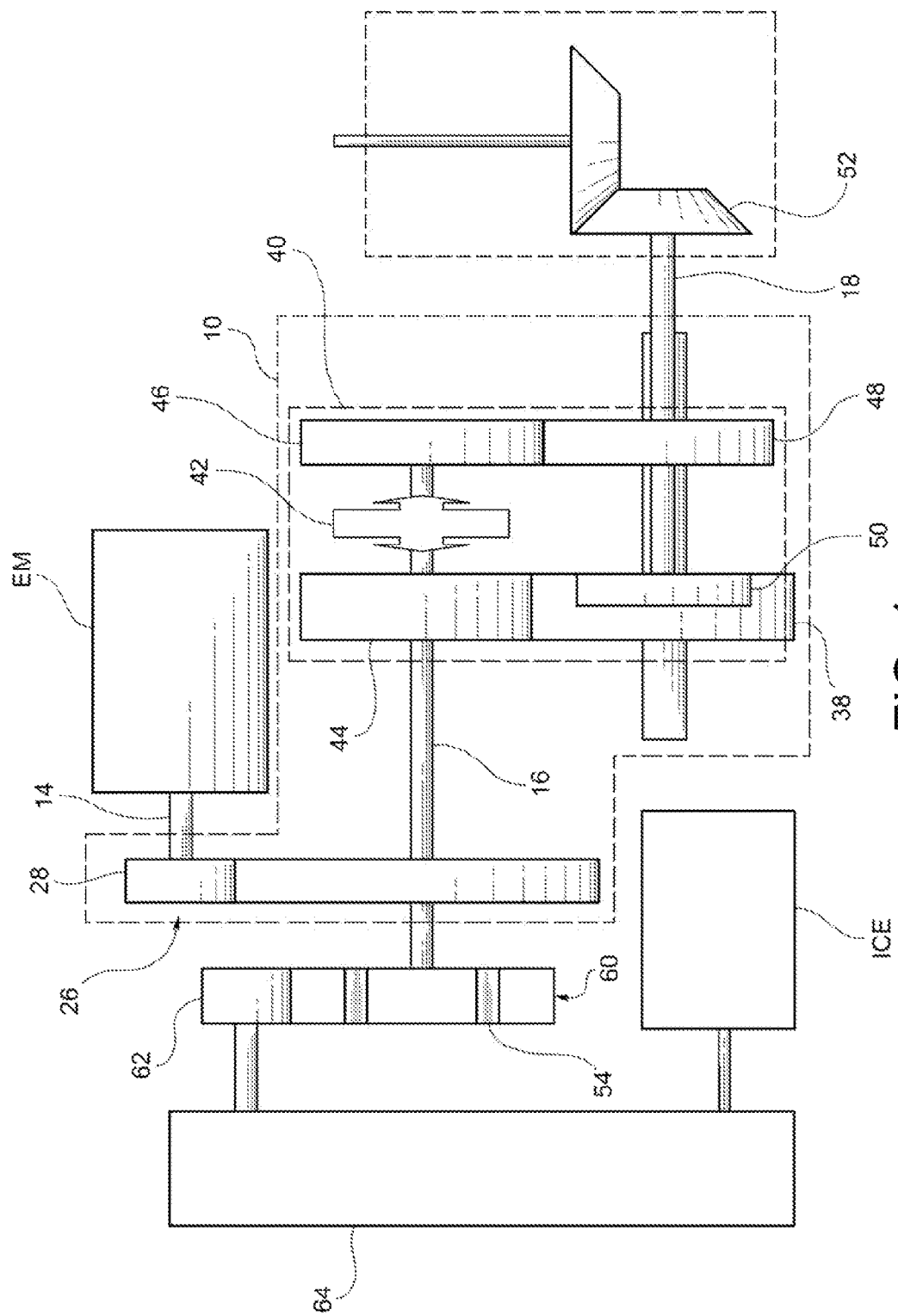
FIG. 1 schematically shows a hybrid propulsion system for a vehicle incorporating a transmission according to the present invention.

With reference to the drawings, a transmission for a hybrid motor vehicle is generally indicated 10 and includes a casing 12 in which a primary shaft 14, a secondary shaft 16 and a lay shaft 18 are supported, by bearings 20, 22 and 24, for rotation about respective axes of rotation x1, x2 and x3 that are arranged parallel to each other and are spaced apart from each other.

Figure 2:
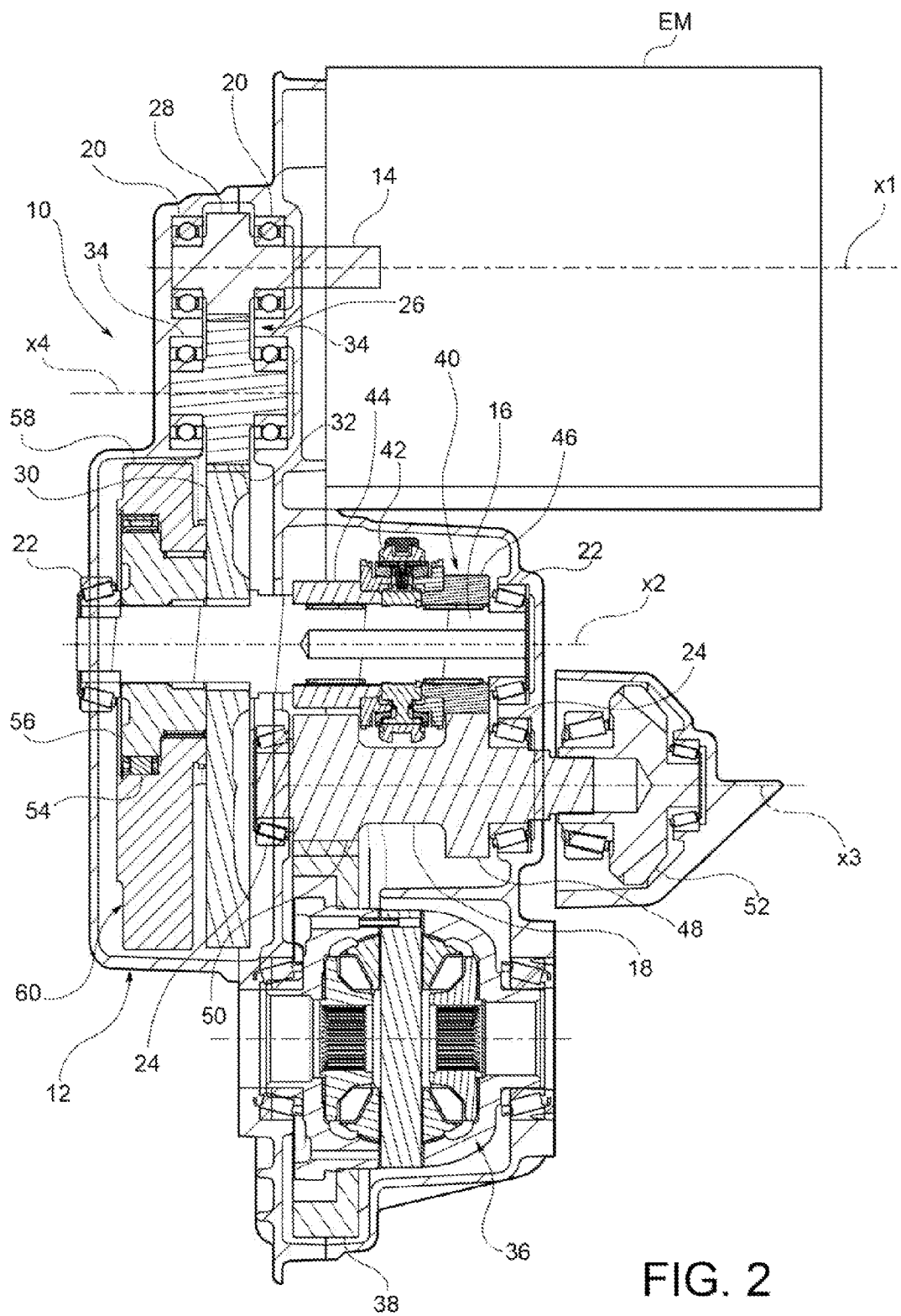
FIGS. 2 and 3 provide a section view and a perspective view, respectively, of a transmission for a hybrid motor vehicle according to the present invention.

As can be seen in FIG. 2, the primary shaft 14 may be connected to an electric machine EM of the vehicle, which may be adapted to operate both as a motor and as a generator. The electric machine EM may be fixed to the casing 12 coaxially to the primary shaft 14.

Figure 3:
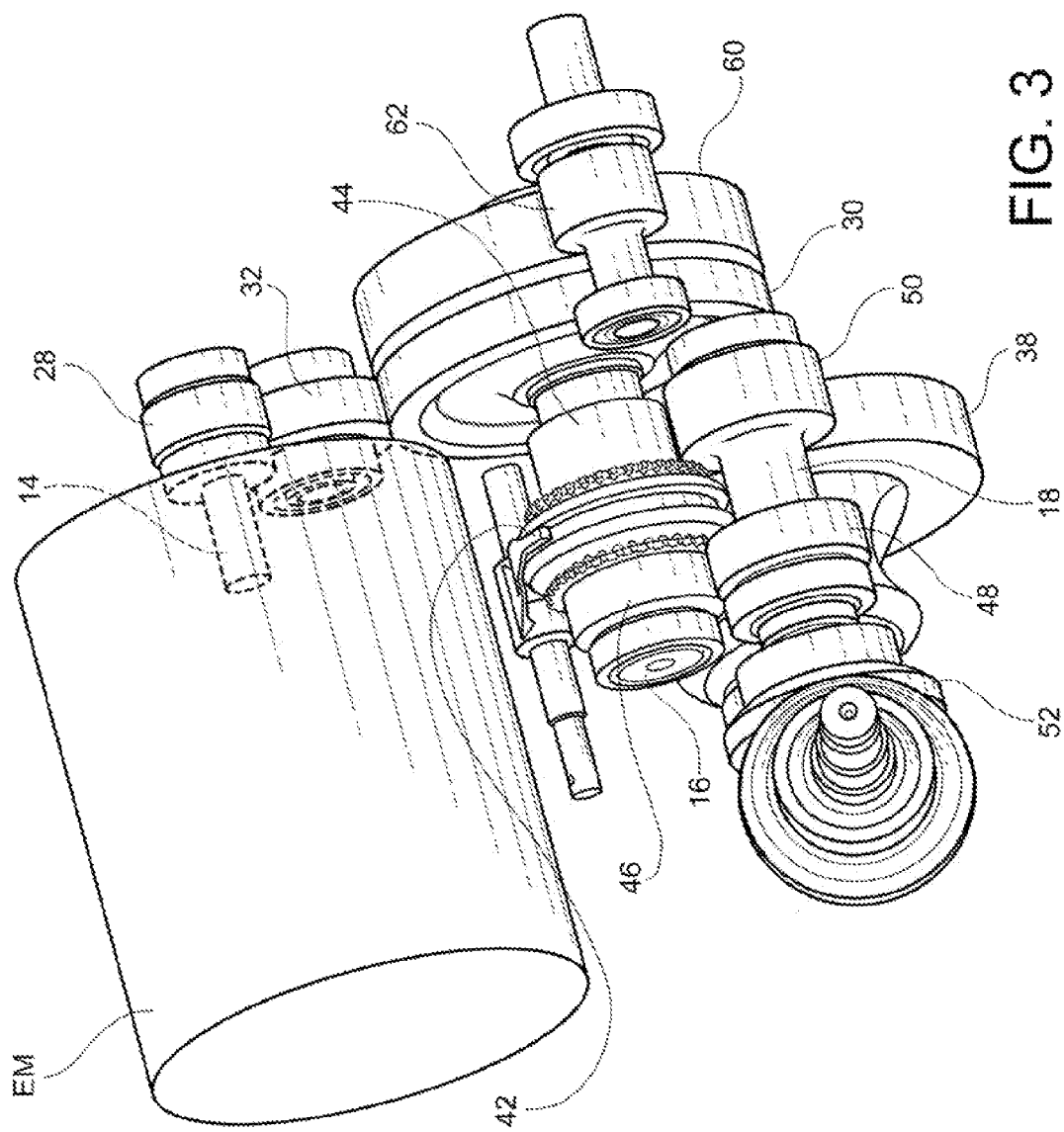

The primary shaft 14 transmits the rotary motion to the secondary shaft 16 through a transmission mechanism 26, which according to the representative embodiment shown in FIGS. 2 and 3 may include a gearing having a driving pinion 28, which is mounted on the primary shaft 14 so as to be drivingly connected for rotation therewith (in certain embodiments the driving pinion 28 is integrally formed with the primary shaft 14), a driven gearwheel 30, which is mounted on the secondary shaft 16 so as to be drivingly connected for rotation therewith, and an intermediate gearwheel 32, which is supported by the casing 12 by bearings 34 to rotate about an axis x4 parallel to the axes of rotation x1 and x2 of the primary shaft 14 and of the secondary shaft 16 and spaced apart from these axes and which permanently meshes both with the driving pinion 28 and with the driven gearwheel 30. In this way, therefore, the electric machine EM directly drives the rotation of the primary shaft 14 and, via the gearing forming the transmission mechanism 26, of the secondary shaft 16 with a fixed transmission ratio depending on the number of teeth of the gearwheels 28, 30 and 32 forming this gearing. Alternatively, the transmission mechanism 26 may be formed by, or at least include, a mechanical gearbox, so as to allow variation in the transmission ratio between the primary shaft and the secondary shaft (and hence between the electric machine and the secondary shaft).

The secondary shaft 16 transmits the rotary motion to the wheels of an axle of the vehicle, which may be the front axle or the rear axle, via a differential 36. The differential 36, which may be of a conventional type and which will not therefore be further described herein, may be received inside the casing 12. More specifically, the secondary shaft 16 may transmit the rotary motion to a ring gear 38 operating as input gear of the differential 36 via a transmission mechanism 40, which in an embodiment of the invention, as shown in FIGS. 2 and 3, may be configured so as to allow the reversal of the direction of rotation of the ring gear 38. In this connection, the transmission mechanism 40 may include a first gearing for transmitting the rotary motion from the secondary shaft 16 to the ring gear 38, a second gearing for transmitting the rotary motion from the secondary shaft 16 to the ring gear 38 in the opposite direction with respect to the first gearing, and a coupling device 42 for selecting the first or the second gearing. The first gearing may include a gearwheel 44, which is carried by the secondary shaft 16 and permanently meshes with the ring gear 38 of the differential 36. The second gearing may include a gearwheel 46 carried by the secondary shaft 16 and a pair of gearwheels 48 and 50 carried by the lay shaft 18, of which the gearwheel 48 permanently meshes with the gearwheel 46 carried by the secondary shaft 16, while the gearwheel 50 permanently meshes with the ring gear 38 of the differential 36.

In the illustrated embodiment, the gearwheels 48 and 50 are made as fixed gearwheels, i.e. as gearwheels that are permanently fixed for rotation with the respective shaft (lay shaft 18), while the gearwheels 44 and 46 are made as idle gearwheels and are selectively connectable for rotation with the respective shaft (secondary shaft 16) by means of the coupling device 42. In this way, with the direction of rotation of the secondary shaft 16 remaining unchanged, the rotary motion can be transmitted to the ring gear 38 of the differential 36 in one direction or the other depending on the coupling device 42 selecting the first or the second gearing, i.e. connecting the gearwheel 44 or the gearwheel 46 for rotation with the secondary shaft 16. More specifically, the first gearing may be used for driving the vehicle in the forward direction, in which case the rotary motion is transmitted directly from the secondary shaft 16 to the differential 36, while the second gearing may be used for driving the vehicle in the rearward direction, in which case the rotary motion is transmitted from the secondary shaft 16 to the differential 36 via the lay shaft 18.

Alternatively, the transmission mechanism 40 may be configured in such a way as not to allow reversal of the direction of the rotary motion and hence consist only of the gearwheel 44 that is carried by the secondary shaft 16 and meshes with the ring gear 38 of the differential 36. In this case, driving in the rearward direction would take place only in electric mode by reversing the direction of rotation of the electric machine EM.

In certain embodiments, an output pinion 52, which may be a bevel pinion, is mounted on the lay shaft 18 so as to be drivingly connected for rotation with this shaft to allow transmission of the rotary motion also to the wheels of the other axle of the vehicle. The output pinion 52 may be mounted on the secondary shaft 16, for example if the lay shaft 18 is omitted. The transmission 10 thus can be used, with a simple modification for four-wheel-drive vehicles.

The connection of the transmission to the internal combustion engine of the vehicle, indicated ICE in FIG. 1, may take place via an overrunning clutch 54, which in the illustrated embodiment (see in particular FIG. 2) is interposed between a hub 56 and a ring gear 58 of an input gearwheel 60 mounted on the secondary shaft 16. The hub 56 of the input gearwheel 60 may be drivingly connected for rotation with the secondary shaft 16, while the ring gear 58 meshes with a pinion 62 (FIG. 1) which is set into rotation by the internal combustion engine ICE either directly or, as in the illustrated embodiment, indirectly via a gearbox 64 (FIG. 1), which may be a continuously variable gearbox. According to an aspect of the invention, therefore, a reducer mechanism may be interposed between the overrunning clutch 54 and the internal combustion engine ICE, which reducer mechanism is formed in the proposed embodiment by the ring gear 58 and by the pinion 62, but might also be of a different type, such as a reducer mechanism that includes additional gearwheels or is formed by pulleys connected to each other through belts. As stated previously, such a reducer mechanism allows a more compact layout of the transmission, since the position of the internal combustion engine is no longer constrained by that of the secondary shaft.

In a hybrid motor vehicle provided with a transmission according to embodiments of the invention, the electric machine EM forms the main traction motor of the vehicle, as it is permanently connected to the primary shaft 14 and hence to the wheels (front and/or rear wheels) of the vehicle. The internal combustion engine ICE is connectable via the overrunning clutch 54 to the secondary shaft 16 to transmit driving torque to the vehicle wheels in addition to the driving torque transmitted by the electric machine EM, and therefore operates as an auxiliary traction motor.

According to certain embodiments of the invention, between the electric machine EM and the secondary shaft 16, there is a clutch which allows the electric machine EM to be disconnected from the secondary shaft 16 so as to allow the vehicle to be driven only by the internal combustion engine ICE.

The internal combustion engine ICE also can be used to charge the batteries of the vehicle. The batteries may be charged when the vehicle is running, in which case the resisting torque from the vehicle wheels is added to the resisting torque the electric machine EM operating as a generator applies on the internal combustion engine ICE. It is however also possible to charge the batteries when the vehicle is stationary, by providing a clutch that allows for the disconnection of the secondary shaft 16 from the wheels. In case of a transmission provided with a transmission mechanism 40 allowing reversal of the direction of the rotary motion, this clutch may consist of coupling device 42, which in the neutral position (where it does not connect either the gearwheel 44 or the gearwheel 46 for rotation with the secondary shaft 16) disconnects the secondary shaft 16 from the wheels.

What is claimed is:

1. A transmission for a hybrid motor vehicle provided with an internal combustion engine and with an electric machine, the transmission comprising
   a primary shaft adapted to be set into rotation by the electric machine,
   a secondary shaft,
   a differential for transmitting rotary motion to wheels of a first axle of the vehicle,
   a first transmission mechanism interposed between the primary shaft and the secondary shaft,
   a second transmission mechanism interposed between the secondary shaft and the differential,
   an overrunning clutch associated with the secondary shaft in such a manner that the secondary shaft is arranged to be set into rotation by the internal combustion engine via the overrunning clutch,
   and a reducer mechanism upstream of the overrunning clutch, wherein the secondary shaft is arranged to be set into rotation by the internal combustion engine via said reducer mechanism, as well as via the overrunning clutch, wherein an input gearwheel is mounted on the secondary shaft and comprises a hub and a ring gear, the hub being drivingly connected for rotation with the secondary shaft, wherein the overrunning clutch is interposed between the hub and the ring gear of the input gearwheel, and wherein the reducer mechanism comprises the ring gear and a pinion, said pinion being arranged to be set into rotation by the internal combustion engine and wherein said pinion meshes directly or indirectly with the ring gear.

2. The transmission of claim 1, wherein said first transmission mechanism is formed by a gearing comprising a driving pinion carried by the primary shaft and a driven gearwheel carried by the secondary shaft, the driving pinion and the driven gearwheel each being drivingly connected for rotation with each respective shaft.

3. The transmission of claim 1, wherein said first transmission mechanism comprises a mechanical gearbox.

4. A hybrid propulsion system for a vehicle, comprising a transmission, an electric machine and an internal combustion engine, wherein the transmission comprises
- a primary shaft directly connected to the electric machine to be set into rotation by the electric machine,
- a secondary shaft,
- a differential for transmitting rotary motion to wheels of a first axle of the vehicle,
- a first transmission mechanism interposed between the primary shaft and the secondary shaft,
- a second transmission mechanism interposed between the secondary shaft and the differential,
- an overrunning clutch associated with the secondary shaft in such a manner that the secondary shaft is arranged to be set into rotation by the internal combustion engine via the overrunning clutch, and
- a reducer mechanism upstream of the overrunning clutch, wherein the secondary shaft is arranged to be set into rotation by the internal combustion engine via said reducer mechanism, as well as via the overrunning clutch, the system further comprising a gearbox interposed between the internal combustion engine and the reducer mechanism.

5. The hybrid propulsion system of claim 4, wherein said gearbox is a continuously variable gearbox.

6. A transmission for a hybrid motor vehicle provided with an internal combustion engine and with an electric machine, the transmission comprising
- a primary shaft adapted to be set into rotation by the electric machine,
- a secondary shaft,
- a differential for transmitting rotary motion to wheels of a first axle of the vehicle,
- a first transmission mechanism interposed between the primary shaft and the secondary shaft,
- a second transmission mechanism interposed between the secondary shaft and the differential,
- an overrunning clutch associated with the secondary shaft in such a manner that the secondary shaft is arranged to be set into rotation by the internal combustion engine via the overrunning clutch,
- and a reducer mechanism upstream of the overrunning clutch, wherein the secondary shaft is arranged to be set into rotation by the internal combustion engine via said reducer mechanism, as well as by the overrunning clutch, wherein said second transmission mechanism comprises a lay shaft adapted to be connected for rotation both with the secondary shaft and with the differential to allow reversal of a direction of rotation of the differential, a direction of rotation of the secondary shaft remaining unchanged.

7. The transmission of claim 6, wherein said second transmission mechanism comprises a coupling device shiftable in a neutral position in which the coupling device disconnects the secondary shaft from the differential and from the lay shaft.

8. The transmission of claim 6, further comprising an output pinion mounted on the lay shaft so as to be drivingly connected for rotation with the lay shaft to allow transmission of the rotary motion to wheels of a second axle of the vehicle.

* * * * *